March 22, 1938.                G. RUANE                2,111,740
                              PIPE COUPLING
                           Filed Dec. 1, 1936
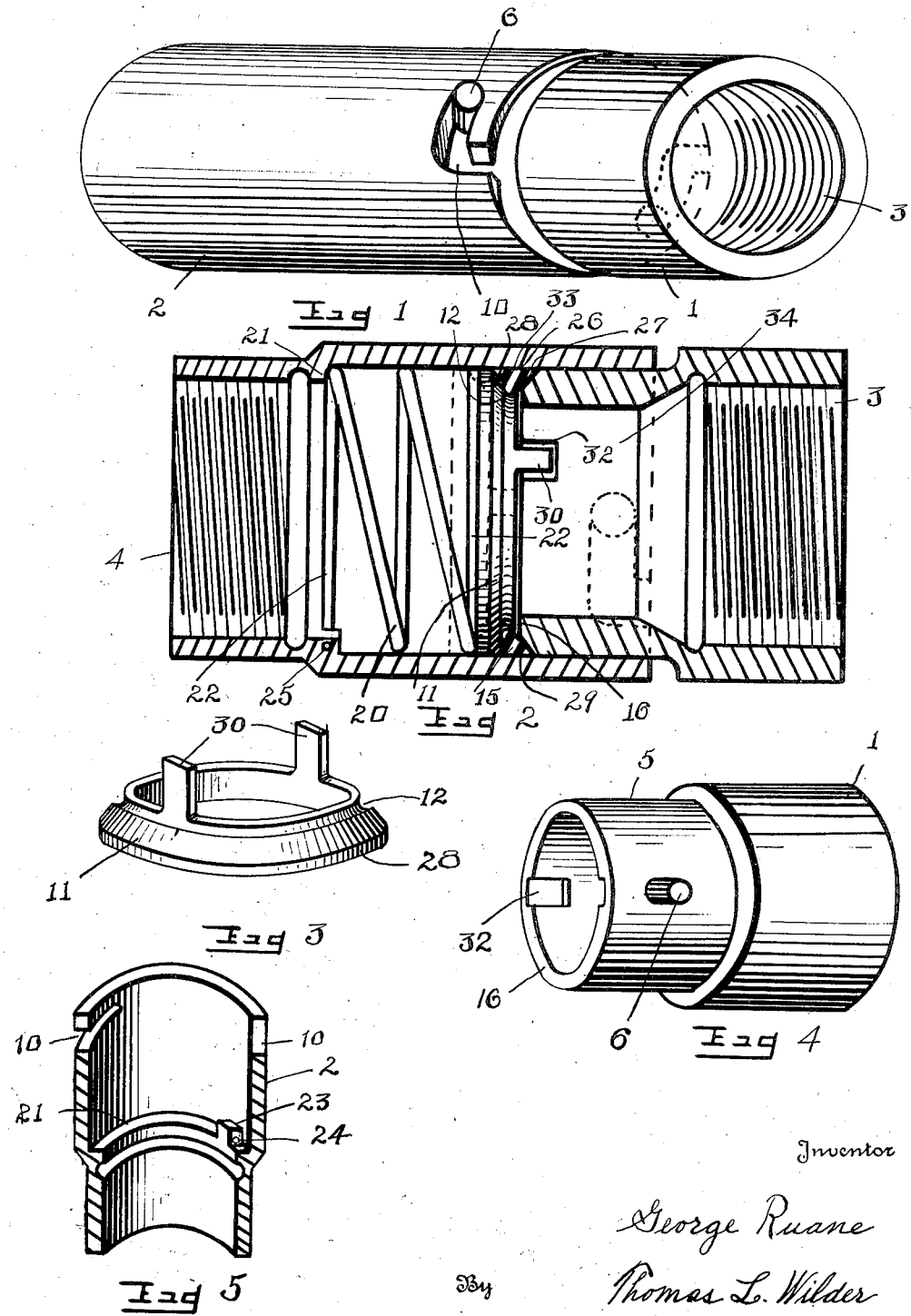
Inventor
George Ruane
Thomas L. Wilder
By           Attorney Patented Mar. 22, 1938

2,111,740

UNITED STATES PATENT OFFICE 2,111,740

PIPE COUPLING

George Ruane, Utica, N. Y.

Application December 1, 1936, Serial No. 113,645

4 Claims. (Cl. 285—175)

My invention relates to a pipe coupling and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a structure by which pipes may be coupled together in a hermetically sealed manner by a very simple coupling which can be easily manipulated to effect the desired result.

The structure avoids the spoiling of threads and the minimum wear upon the packing in coupling or uncoupling the pipes. It is designed, furthermore, to allow for the same diameter as the connected pipes, whereby not to interfere with the passage of water therethrough. Heretofore, in inventions of this character the structure has necessitated a smaller diameter in the coupling proper than that of the adjacent pipes which necessarily interferes with the flow of the liquid past the coupling. This is avoided in the present structure where the conduit of the coupling is of the same diameter as that of the connected pipes.

The object will be understood by referring to the drawing in which

Fig. 1 shows a perspective of the coupling.

Fig. 2 is a central vertical section.

Fig. 3 is a detail view showing a perspective of a washer employed.

Fig. 4 is a detail view showing a perspective of the male part of the coupling engaged.

Fig. 5 is a detail view on a smaller scale showing a perspective partially in section of the female member employed.

Referring more particularly to the drawing, the device embodies a male member 1 and a female member 2. Male part 1 has in its end, internal screw threads 3 for screw mounting an inlet or supply pipe, not shown, thereto. Likewise, female member 2 has its end internal screw threads 4 for screw mounting to the end of an outlet pipe, not shown.

The male member 1 has a reduced part 5 and from the outside surface of which project studs 6, 6 that are located diametrically opposite each other. Studs 6, 6 are intended to engage the corresponding bayonet slots 10, 10 formed in the corresponding end of female member 2, whereby to hold members 1 and 2 in assembled or joined position.

The means for effecting a hermetically air tight joint embodies a metallic washer 11 having an open arc shaped groove 12 forming a socket into which is disposed in a somewhat tight manner a removable annular rubber or fabric gasket 15. Groove 12 holds rubber gasket 15 sufficiently tight to prevent it from falling thereout especially when assembling the parts of the joint. Washer 11 is held yieldingly against the inner end 16 of male member 1 when the parts are assembled by a coiled spring 20 that rests at one end against an annular shoulder formed at 21. Shoulder 21 is formed by reducing the diameter of the bore of female member 2. Furthermore, the end strands 22, 22 of coiled spring 20 are disposed in parallel relation to each other, whereby to rest flat against the respective surfaces of shoulder 21 and washer 11. A lug 23 formed integral with female member 2 and upstanding from shoulder 21 has an aperture 24 therein, whereby to receive the free end 25 of coiled spring 20 to hold said spring in its assembled position. Moreover, washer 11 is given room at 26 for compression against the contiguous wall of female member 2, whereby to effect a complete seal at this junction, by beveling the inner end of male member 1 at 27 and also by beveling the cooperating part 28 of washer 11. The cooperating bevels 27 of male member 1 and 28 of washer 11 will effect a wedge compression against the contiguous surfaces of rubber gasket 15 of washer 11, as at 29.

The means for preventing wear on rubber gasket 15 when male member 1 is turned relative to female member 2 in coupling or assembling or disassembling the parts embodies upstanding lugs 30, 30 formed at diametrically opposite locations on washer 11. Lugs 30, 30 will ride over the inner edge 16 of male member 2, when coupling the same with female member 2 until they come opposite the countersunk recesses 32, 32 formed in contiguous end 16 of male member 1 when they will drop therein and, thereby, allow coiled spring 20 to force washer 11 and rubber gasket 15 thereon home in place up against the inner beveled edge 27 of male member 1 which will compress said rubber gasket 15 against the contiguous wall 33 of female member 2. In this instance rubber gasket 15 will take the pressure of spring 20 exerted directly against washer 11.

It will be observed that the bore 34 of male member 1 is sufficiently large to compensate for the thickness of any pipe, not shown, screw threaded thereto, whereby the internal conduit of said pipe will be of the same diameter as the conduit or passageway 34 in the reduced end portion 5 thereof.

In operation, the coiled spring 20 is disposed in female member 2 up against shoulder 21 thereof and then washer 11 placed thereagainst as shown in Fig. 2. Male member 1 is then brought up opposite female member 2 with studs 6, 6 thereof in alignment with the lower parts of bayonet slots 10, 10 whereupon male member 1 is pushed into female member 2 against the tension of coiled spring 20 and then turned to the right until studs 6, 6 reach the end of bayonet slots 10, 10 whereupon male member 1 is joined to female member 2 against the tension of coiled spring 20 as shown in Fig. 2. In the meantime lugs 30, 30 will ride over the inner edge 16 of male member 1 and as studs 6, 6 reach their final locking destination drop down into countersunk recesses 32, 32 to allow the force of coiled spring 20 to urge washer 11 and its rubber gasket 15 longitudinally, whereby said beveled edge 28 and its cooperating beveled edge 27 of member 1 will compress rubber gasket 15 against the contiguous wall 33 of female member 2 to effect a sealed joint.

Having thus described my invention what I claim as new and desire to secure by Letters Patent is as follows:

1. In a pipe coupling comprising a male member, studs projecting from said male member, bayonet slots formed in said female member for the reception of the studs of the male member, whereby to detachably connect said members together, the outer portions of the member being internally threaded, the female member having a threaded counterbore in its inner portion providing an internal shoulder, an annular packing mounted in the counterbore engageable with the inner end of the male member, a coil spring mounted in the counterbore and having one end engaged with the shoulder and its other end engaged with the packing for yieldingly urging said packing against the wall of the female member and lugs formed on said packing member for engaging the end of said male member, whereby to prevent a contact of the male member with the packing member under given conditions.

2. In a pipe coupling comprising a male member, members projecting from said male member, a female member for the reception of the male member, bayonet slots formed in said female member for the reception on the projections on the male member, whereby to detachably connect said members together, said female member having a threaded counterbore in its inner portion and providing an internal shoulder, an annular packing mounted in the counterbore engageable with the inner end of the male member, a coil spring mounted in the counterbore having one end engaged with the shoulder and the other engaged with the packing for yieldingly holding said packing against the said male member, means for holding said spring in assembled position, and lugs formed on said packing member for engaging the end of the male member, whereby to prevent contact of the male member with the packing member until a predetermined time.

3. In a pipe coupling comprising a male member, a female member, a washer holding a gasket, spring means for holding said washer in give relation to said parts, whereby to seal the union thereof, upstanding members formed on said washer and recesses formed in one of said members for the reception of said lugs.

4. In a pipe coupling comprising a male member, a female member, a spring pressed washer disposed within one of said members, lugs formed on said washer, whereby to effect a predetermined relation between said parts and recesses formed in one of said first named member for the reception of lugs to allow for closer union between said parts.

GEORGE RUANE.